United States Patent
Hucks et al.

(10) Patent No.: US 7,060,788 B2
(45) Date of Patent: Jun. 13, 2006

(54) PROCESS FOR STRIPPING MONOMERS AND OTHER VOLATILE CONSTITUENTS FROM POLYMER MELTS

(75) Inventors: Uwe Hucks, Alpen (DE); Thomas König, Leverkusen (DE); Melanie Möthrath, Düsseldorf (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 11/002,396

(22) Filed: Dec. 2, 2004

(65) Prior Publication Data

US 2005/0197489 A1 Sep. 8, 2005

(30) Foreign Application Priority Data

Dec. 6, 2003 (DE) ............................... 103 57 183

(51) Int. Cl.
*C08F 6/00* (2006.01)
(52) U.S. Cl. ................... 528/501; 422/131; 422/196; 422/197; 422/198
(58) Field of Classification Search ................ 422/131, 422/196, 197, 198; 528/501
See application file for complete search history.

(56) References Cited

U.S. PATENT DOCUMENTS

| | | | | |
|---|---|---|---|---|
| 3,591,344 | A | 7/1971 | Schnock et al. ............... 22/285 |
| 3,630,688 | A * | 12/1971 | Takiguchi et al. ........... 422/135 |
| 3,761,059 | A | 9/1973 | Rothert et al. .................. 259/9 |
| 3,838,139 | A * | 9/1974 | Latinen ......................... 526/88 |
| 4,215,024 | A | 7/1980 | Gomez et al. ............. 260/23 S |
| 4,318,773 | A | 3/1982 | Ullrich et al. ............ 159/47 R |
| 4,423,960 | A | 1/1984 | Anders ......................... 366/75 |
| 4,537,734 | A | 8/1985 | Morganstern ................ 264/22 |
| 4,699,976 | A | 10/1987 | Matsubara et al. ......... 528/501 |
| 4,906,329 | A | 3/1990 | Tominari et al. ........... 159/47.1 |
| 4,940,472 | A | 7/1990 | Hay, II et al. ................. 55/195 |
| 4,981,554 | A | 1/1991 | Loconsolo et al. ........... 159/6.1 |
| 5,043,421 | A | 8/1991 | Golba, Jr. et al. ........... 528/495 |
| 5,306,803 | A | 4/1994 | Arlt et al. .................... 528/480 |
| 5,691,445 | A | 11/1997 | Krupinski et al. .......... 528/483 |
| 5,779,986 | A | 7/1998 | van Endert et al. ......... 422/136 |
| 6,096,838 | A | 8/2000 | Nakamoto et al. ............ 526/64 |
| 6,630,563 | B1 | 10/2003 | Hucks et al. ................ 528/196 |
| 2002/0188091 | A1 | 12/2002 | Huck et al. ................. 528/196 |
| 2003/0133856 | A1 * | 7/2003 | Le .............................. 422/198 |
| 2004/0102593 | A1 | 5/2004 | Eltel et al. ................... 526/341 |

FOREIGN PATENT DOCUMENTS

| | | |
|---|---|---|
| EP | 768 337 B1 | 6/2000 |
| GB | 1 227 493 | 4/1971 |

OTHER PUBLICATIONS

Chemische Industrie, 37(7), (month unavailable) 1985, pp. 473-476, F.A. Streiff, G. Schneider, "Neue Mischverfahren mit geringem Energiebedarf für Polymerherstellung und -aufbereitung".

Kunststoffe, 71, (month unavailable) 1981, pp. 18-26, Von Dr.-Ing. H. Werner, Stuttgart "Entgasen von Kunststoffen in mehrwelligen Schneckenmaschinen" (also see translation attached).

Kaempf R: "Polymerisieren Im Ringscheibenreaktor" Kunststoffe, Carl Hanser Verlag. Munchen, DE, Bd. 82, Nr. 1, 1992, Seiten 17-20, XP001074296.

* cited by examiner

*Primary Examiner*—Terressa Boykin
(74) *Attorney, Agent, or Firm*—Joseph C. Gil; Aron Preis

(57) ABSTRACT

A process for stripping volatile constituents from polymer melts is disclosed. The process entails introducing the polymer melt into a horizontally oriented cylindrical device that contains a plurality of perforated disks rotating about a common horizontally oriented, externally driven shaft bringing the melt and disks into contact in a manner calculated to constantly renew the surface of the melt to be stripped. Also disclosed is an apparatus suitable for the process.

4 Claims, 1 Drawing Sheet

PROCESS FOR STRIPPING MONOMERS AND OTHER VOLATILE CONSTITUENTS FROM POLYMER MELTS

FIELD OF THE INVENTION

The invention relates to aprocess and in particular to a process for stripping volatile constituents from polymers melts.

BACKGROUND OF THE INVENTION

The removal of volatile constituents from polymer melts is generally one of the last process steps in the production of polymers. The volatile constituents to be removed may be solvents which were used for the production of the polymers or residues of unreacted monomers after concluded transesterification or esterification or polymerisation reactions and elimination products from transesterification or esterification reactions.

For the purposes of the present invention, volatile constituents are taken to mean any volatile impurities such as monomers, i.e. any starting materials, and volatile components of all kinds such as for example solvents, low molecular weight reaction products, elimination products from the reaction, and decomposition and breakdown products which arise during the reaction, together with any secondary compounds introduced via the feedstocks. In relation to the residual monomers, low molecular weight reaction products are hereinafter taken to mean those with a degree of polycondensation of up to 3.

The removal of such constituents is necessary because such accompanying substances generally give rise to deficiencies in material properties such as thermal stability, processability, flow behavior etc. Such volatile constituents may also give rise to unwanted odor nuisances and/or be harmful to health.

Various apparatuses or processes are known depending on the viscosity of the polymer melts from which the volatile constituents are to be removed. Known apparatuses for this task in polymer melts are, for example, film evaporators or filmtruders, screw machines, strand evaporators or tubular evaporators.

Removal of volatile constituents by chemical means is described, for example, in EP 0 768 337 A1. Removal is effected by addition of CH-acidic organic compounds. The chemical conversion of residual monomers may possibly give rise to products with unwanted environmental impact, which distinctly complicates the use of the products in practical applications. Said process also cannot be used for removing residual solvents.

The process for reducing residual monomers with unsaturated fatty acids according to U.S. Pat. No. 4,215,024 suffers from the same shortcomings.

Another known process describes the reduction of residual monomers by treating the moulding compositions with electron beam radiation, as described in DE 2 843 292 A1. The process is, however, much too costly on a full industrial scale. A process for the removal of residual volatiles by injection of supercritical solvents or gases into the polymer melt with subsequent depressurisation described in EP 0 798 314 A1 has also proved equally costly.

Conventional and usual processes are also based on the removal of volatile constituents by means of mechanically assisted systems. Accordingly, extruders, such as for example in U.S. Pat. No. 4,423,960, DE 2 721 848 C2, EP 0 411 510 B1 or in "Entgasen von Kunststoffen in mehrwelligen Schneckenmaschinen" [Degassing of plastics in multiscrew machines], Kunststoffe 71 (1981), pages 18–26, devolatilising centrifuges (U.S. Pat. No. 4,940,472), friction compaction (EP 0 460 450 A2) or film evaporators (DE 1 925 063 A1 or EP 0 267 025 A1) are used. These processes conventionally have a short residence time of the order of a few minutes.

All the above-stated mechanically assisted processes exhibit the disadvantage that heavy moving parts which move at high rotational speed and rotational frequencies are required in the apparatus. This results in costly apparatus or machinery which is susceptible to malfunctioning and wear. If adequate degassing efficiency is to be achieved, frequent circulation of the product is necessary. At the short residence times, elevated temperatures are, on the one hand, necessary in order to shift the diffusion coefficients and physical equilibria of the volatile components towards favourable values. On the other hand, such elevated temperatures are unavoidable because the frequent circulation of the product results in elevated input of energy. The person skilled in the art is aware that elevated temperatures strongly promote and accelerate unwanted reactions in polymers. Such reactions result in unwanted reductions in quality, such as for example discoloration and/or formation of gel particles, particles or specks and branched structures or even dissociation into monomers. The mechanical energy is usually produced from electrical energy, resulting in higher costs relative to the use of primary energy. Typical energy inputs of such processes are in the order of 0.05 to 0.2 kWh/kg of product.

"Static" degassing processes, which introduce mechanical energy only via pumps, usually gear pumps, are furthermore known to the person skilled in the art. These static processes operate in such a manner that a polymer melt, optionally with additives, is introduced into a degassing vessel, in which the volatile constituents evaporate and are drawn off in gaseous form. Such processes often have multiple stages.

One example of a static process is DE 10 031 766 A1, which describes a two-stage, continuous process for degassing styrene copolymers, in which, in a first stage, the concentration of polymer is adjusted to above 99.8 wt. % in a shell-and-tube heat exchanger with evaporation of volatile constituents and simultaneous input of energy and, in a second stage, the final concentration is obtained in a strand evaporator without intermediate superheating.

A strand evaporator operates by forming free-falling strands of melt in a cabinet, i.e. without supply of mechanical energy. In the cabinet, the strands are generally exposed to a vacuum at elevated temperatures. The heights of such apparatus are limited and thus so too is the residence time during which evaporation may occur. Another disadvantage of the process resides in the very large number of holes which are required for a good degassing result in the strand evaporator. The diameters of the holes are in the lower, single digit millimetre range, while, at throughput of a few tonnes per hour, the holes range in number from some thousands to a hundred thousand. This is disadvantageous. Given the large number of holes, it is to be feared that specks and swollen solids may give rise to blockages and disruption to flow on exit from the hole. Finally, the efficiency of a strand evaporator depends on the stability of the strands, which in turn depends in complex manner on product rheology, flow conditions in the gas space of the strand evaporator, the geometry and quality of the holes and temperature. It is accordingly difficult to establish and control constant processing conditions.

Another example of a static process is U.S. Pat. No. 4,699,976, which describes a two-stage, continuous process for degassing rubber-containing styrene polymers. This process uses two degassing stages which are equipped with shell-and-tube heat exchangers. In the first stage, the polymer solution is concentrated to a residual content of volatile constituents of between 3% and 15%. In the second stage, evaporation is then performed to obtain the desired final concentration. During this process, foaming occurs inside the tubes. This process cannot, however, be used if the concentration of volatile constituents is so low that the polymer melt does not foam because the volume of gas which arises is insufficient.

"Neue Mischverfahren mit geringem Energiebedarf für Polymerherstellung und-aufbereitung" [Novel low-energy mixing processes for polymer production and processing], Chemische Industrie (1985) 37 (7), pages 473 to 476, describes a static process in which, prior to the final stage, an entraining agent is mixed with the polymer before the product is introduced in the final stage into a degassing vessel. As is familiar to the person skilled in the art, the entraining agents used are primarily inert gases, such as for example nitrogen or carbon dioxide or alternatively also water. In EP 0 027 700 A2, an inert entraining agent from the group comprising water, nitrogen, carbon dioxide or hydrocarbons with one to four carbon atoms is mixed with a polymer solution and flashed in a chamber. Both the above-stated processes have disadvantages. Inert gases reduce the performance of the condensers in which the volatile constituents are to be condensed and increase the volume to be conveyed by the vacuum system, so increasing the cost of the process. The use of water is disadvantageous because it entails restricting the temperature of the condensers to above 0° C. in order to prevent freezing and this limits the performance of the condensing system, which must in turn be compensated by a larger and more costly vacuum installation. Water may also react with various polymers, resulting in degradation of molecular weight and impairment of properties.

The concentration of residual volatiles is at thermodynamic equilibrium, when, with ideal mass transfer and after an adequate residence time, the product is at equilibrium with the gas in the stripping apparatus at the selected temperature and the selected pressure, i.e. the concentration undergoes no further change. Changes of a chemical nature due to thermal processes, such as dissociation, decomposition and the like, may severely restrict this statement and are not taken into account in the definition. This definition is familiar to the person skilled in the art. If degassing is to be possible at all in an apparatus, the concentration of residual volatiles in the product must always be higher than corresponds to the thermodynamic equilibrium. A degassing apparatus is particularly advantageous if the concentrations of the constituents to be stripped at the outlet thereof are as close as possible to the thermodynamic equilibrium, it being physically impossible for the concentrations to fall below this level.

Static processes of the above-stated kind have the disadvantage that, for each stage, they permit and enable only one single desgassing step in order to move towards the thermodynamic equilibrium before the product is again discharged from the stage. If, for reasons of degassing efficiency, it is possible in the individual stage to reduce the concentration of a volatile component only by, for example, a factor of 3 relative to the input value, but the degassing task requires a reduction by a factor of 20 relative to the input value, a three-stage installation is required. Obviously, this is costly, highly complex and thus to be avoided if at all possible.

Without exception, the stated apparatuses have short residence times. It is endeavoured to achieve short residence times in order to reduce the products' exposure to elevated temperatures because, as is familiar to the person skilled in the art, exposure to elevated temperatures results in quality impairment, such as for example discoloration and/or in the formation of particles or specks due to secondary and decomposition reactions. The short residence times relate only to those states in which the product has a large surface area per unit mass in the stripping apparatus, i.e. not in "sumps" in which the product is collected prior to discharge from the evaporation apparatus, where the surface area per unit mass is low.

In order to achieve the aim of low content of residual solvents or monomers, in known, mechanically assisted processes and apparatuses temperatures are raised, vigorous surface renewal is achieved, usually by elevated energy input, and it is endeavoured to achieve the best vacuums so that stripping may be performed efficiently, if possible within short residence times. In order to be able to operate with short residence times, the fullest possible use must be made of the effective parameters such as temperature, elevated mechanical energy input for rapid surface renewal and vacuum. The parameters diffusion and mass transfer, which are also highly significant, are product-specific, temperature-dependent physical variables and can only be influenced within this framework.

However, as a consequence of elevated product temperatures, the processes known from the prior art frequently result in partial modification of the products. These modifications may, for example be manifested by discoloration and particle formation due to secondary and decomposition reactions. The formation of particles or also specks entails increased filtration efforts. Filtration units for viscous products are complex and, due to steep pressure gradients, difficult to operate. Temperatures are often increased in order to lower the melt viscosities of the products and so reduce the pressure gradient. However, the increase in temperature in turn has a disadvantageous impact on product quality.

SUMMARY OF THE INVENTION

A process for stripping volatile constituents from polymer melts is disclosed. The process entails introducing the polymer melt into a horizontally oriented cylindrical device that contains a plurality of perforated disks rotating about a common horizontally oriented shaft bringing the melt and disks into contact in a manner calculated to constantly renew the surface of the melt to be stripped. Also disclosed is an apparatus suitable for the process.

DETAILED DESCRIPTION OF THE INVENTION

Figure 1:
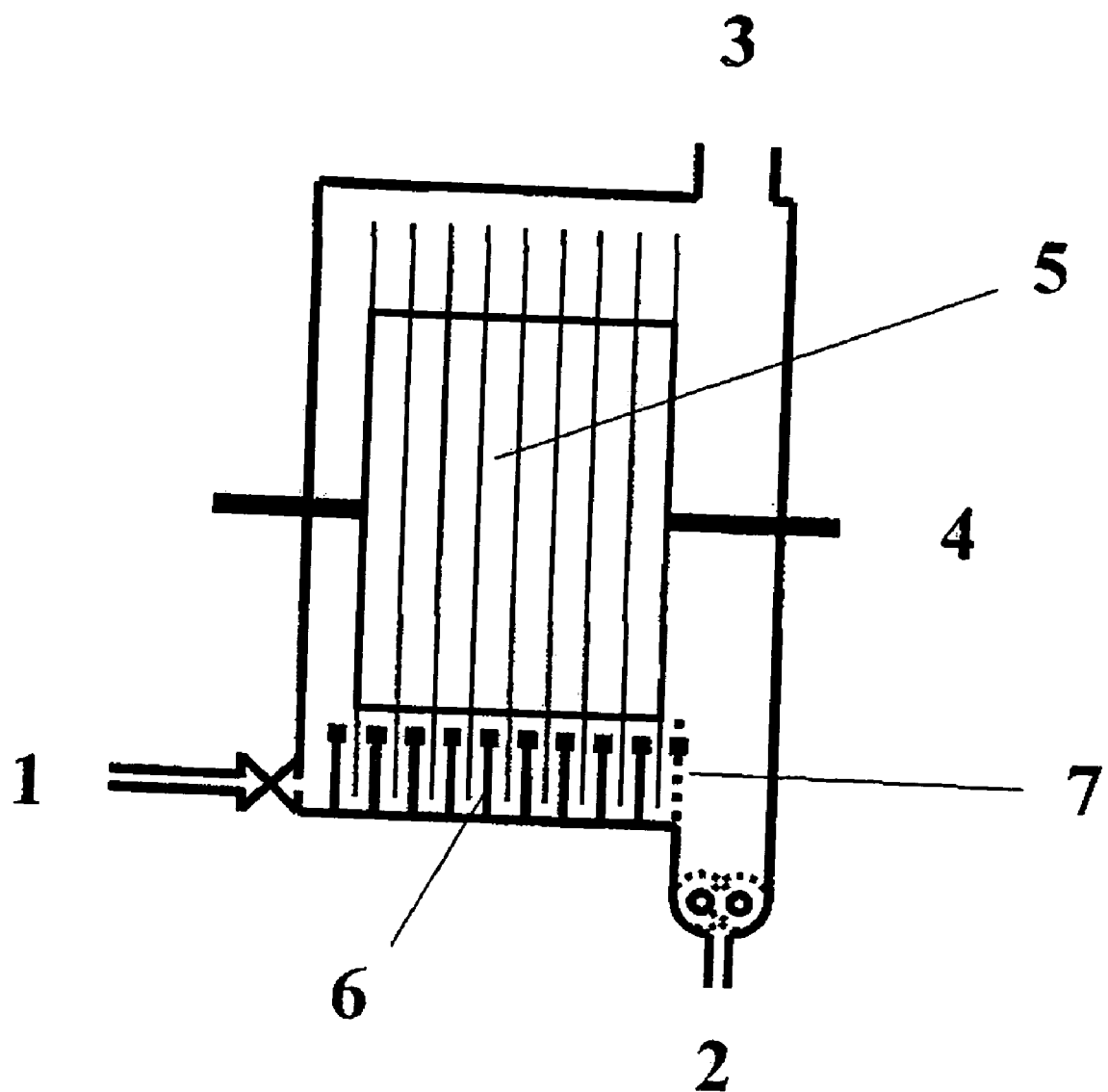
FIG. 1 is a schematic drawing of the preferred embodiment of the inventive apparatus.

The object accordingly arose of providing, on the basis of the prior art, a process for stripping volatile constituents from polymer melts using an apparatus which avoids the disadvantages stated in the prior art and gives rise to good results in terms of stripping volatile constituents and of product quality.

It has now surprisingly been found that an apparatus of rotating perforated annular disks in horizontal cylinders used in a process for stripping volatile constituents from polymer melts does not require a further increase in product temperature and stripping of the volatile constituents may proceed at a comparatively moderate temperature level. Surprisingly, despite the longer residence times, the products produced in this apparatus exhibit good quality. It has also been found that it is advantageous and efficient for stripping if the polymer melt is exposed to the stripping conditions (temperature and vacuum) for a relatively extended period and the melt is continuously taken up from the bottoms in the apparatus, so constantly forming new surfaces, and exposed to the vacuum and remixing of stripped polymer melt with as yet unstripped polymer melt is avoided. The longer residence times permit lower temperatures, which are very gentle on the product. It has also been found to be particularly advantageous that, even at different throughputs, the movement of the melt may be determined and controlled externally by the rotational speed of the rotor, i.e. of the perforated annular disks. In many other apparatuses, the flow profiles and residence times and thus the preconditions for uniform results change as throughput varies. In the apparatus according to the invention, a change in residence time due to a variation in throughput, which always has an impact on the stripping result, may readily be corrected by adjusting filling level and rotational speed.

Particular advantages of the stripping apparatus used according to the invention are its cascading action, the extended residence times, which then also enable lower temperatures, the constantly renewed surfaces due to rotation and consequent continuous film formation and stretching of the films as they run off the disks, the elevated throughputs per unit time which are possible in the stripping apparatus according to the invention and the independence from flow profiles, as occur in other stripping installations. A cascading action is taken to mean that, as a result of the flow through the apparatus from the inlet to the outlet, the product running off the disks is conveyed with this flow towards the outlet and is not mixed with freshly inflowing product. Instead, the melt, which has already in part moved towards thermodynamic equilibrium, is picked up again by the disks and degassed again. This results in the "cascading action", which may also be viewed as a division of the apparatus into several stages in a similar manner as in a column or in a series of stirred-tank reactors. Due to the cascading, surface formation rates are vastly higher than in other stripping installations. It is furthermore advantageous to introduce the melts into the stripping apparatus at low delivery pressures; these pressures are incomparably higher for example in strand evaporator installations due to the very large number of nozzles and the need to achieve a uniform distribution among all the nozzles. Another advantage is the low input of mechanical energy due to low rotational speeds, which rules out product stress due to elevated temperatures and a severe shear field. Further processing of the monomer-reduced melts may be performed without further temperature correction, i.e. under mild conditions, without the melts having to be cooled for further processing operations due to excessively high temperatures, for example downstream from extruders or film evaporators.

The extended residence time and good surface renewal of the apparatus makes it possible in general to achieve the stripping performance of the apparatus without raising the temperature.

In particular, this apparatus does not have the disadvantage of the static apparatuses that only one single stage is possible in order to approach thermodynamic equilibrium. Accordingly, at identical processing pressure, this apparatus is capable of achieving distinctly lower contents of residual volatiles than are static apparatuses. The person skilled in the art would not have expected that excellent product quality may be obtained under conditions of extended residence time.

The object was surprisingly achieved by a process for stripping volatile constituents from polymer melts using an apparatus which, under the action of gravity, constantly forms free films and has an elevated film formation rate. This is achieved with a horizontally arranged stripping apparatus comprising a cylindrical housing which accommodates an externally driven rotor. The rotor comprises perforated disks in the form of circular rings which are connected together. This connection may consist of a central shaft, of external connecting elements, e.g. in form of straight or angled plates or tubes, or of a hollow shaft (herein also referred to as hollow cylinder), which may be perforated. The embodiment with a perforated hollow shaft is preferred.

The perforated disks are circular rings are perforated in such a manner that the ratio of the total area of the circular ring to the area occupied by the webs between the holes is from 2.2–6.5, preferably from 2.5–5. It is particularly preferred to select the equivalent hole diameter in accordance with the formula $$A = x(\eta^2/(kg^2 m^{-5} s^{-2}))^{1/3}.$$

The equivalent hole diameter A is here defined as the diameter of a circle of identical area. The dimensionless numerical factor x may vary between 0.002 and 0.030, preferably between 0.004 and 0.016. $\eta$ is the kinematic melt viscosity in Pas.

The holes may assume various geometric shapes. The holes are preferably in the form of equilateral, rotationally symmetrical polygons which permit constant web widths of the surrounding metal surface, and rectangles.

It is possible to deviate from these shapes at the inner and outer edges of the annular disks so that the edge may be made circular. At elevated viscosities, the equivalent hole diameter is so large that spokes must be provided between the inner and outer edges, optionally with a further division by a central ring. The boundaries of these holes are then the spokes and spoke sections and circular ring sections.

It is preferred that the holes of one disk are of the same size and same geometry. Likewise it is preferred that all disks used in the apparatus are of the same type regarding size and geometry of the holes.

All the metal surfaces or webs surrounding the holes are advantageously of a square or rectangular cross-section. Selection of the web widths makes it possible optimally to adapt the ratio of the melt-bearing area as the circular ring disk emerges from the melt relative to the surrounding hole as a function of melt viscosity and other properties of the melt. In the case of a circular ring disk, it has proved favourable to select all the metal surfaces or webs surrounding the holes to be cross-sectionally constant and identical in size.

The power input into such an apparatus may be very low, of the order of 0.01 kWh/kg. The increase in temperature to which the product is exposed in this apparatus is accordingly slight. Since the internal surface of the apparatus which is available for heat transfer is very large relative to throughput, it is, however, also possible to heat or optionally cool the product by means of the wall temperature.

The rotational speed of the rotors is favourably between 0.3 and 10 revolutions per minute, preferably between 0.5 and 5 revolutions per minute, particularly preferably between 0.8 and 3 revolutions per minute. The film formation rate is here greater than 5 and preferably greater than 10. It is defined as the ratio of the quantity of that material which is drawn up by the rotating disk and runs back down in the form of a free film to the total quantity of the throughput of the reactor.

According to the invention, the described apparatuses corresponding to the above-stated requirements may take various forms.

A preferred apparatus is described in "Polymerisieren im Ringscheibenreaktor" [Polymerising in an annular disk reactor], Kunststoffe 82 (1992) 1, pages 17–20 under the name VSR. The rotor here consists of various wheels which are connected with a central shaft via two (FIG. 2) to four (FIGS. 3 and 4) spokes.

It has been found that a particularly preferred apparatus for stripping volatile constituents from polymer melts is a horizontally arranged cylindrical vessel with an agitator, as is described in DE 44 47 422 C2 (Karl Fischer Industrieanlagen GmbH) column 1, line 63 to column 7, line 39.

The external diameter of the rotor is selected such that it fits into the heatable cylindrical housing (herein also referred to as outer cylinder), the length-to-diameter ratio of the outer cylinder preferably being between 0.6 and 2.5, particularly preferably between 0.8 and 2.

It is also advantageous to arrange the rotor eccentrically in the outer cylinder, such that the vapours formed may be discharged via an enlarged slot in the upper part of the apparatus. This measure brings about a major reduction in entrainment of polymer particles into the vapour line and vacuum installation.

A particular advantage of the particularly preferred embodiment is the extremely rigid construction and form of the hollow shaft bearing the perforated disks. The hollow shaft is likewise provided with orifices or holes, such that the resultant vapours may flow away unimpeded. The manner in which the rotor is mounted makes it possible to operate the reactor with different temperatures in the bottoms zone and in the vapour zone. The design furthermore makes it possible to limit the entrainment of relatively high viscosity melts as the rotor rotates by the incorporation of stators which project between the disks. Especially in the case of relatively high viscosity melts, this measure optimises the ratio of melt surface area to melt volume on the disk.

However, for optimum and thus very particularly preferred use of the apparatus presented in DE 4 447 422 C2 for stripping polymer melts, it is convenient to make still further modifications to the designs presented in the stated application.

If melt viscosities are too low, typically below 20 Pas, it may thus happen that wetting of the rotating circular disk is inadequate. It has proved advantageous in this connection to arrange lifting elements on the outer periphery of the annular disks in such a manner that, as the lifting elements rise, the circular disk is continuously rinsed with melt.

When stripping relatively high viscosity polymer melts, typically above 200 Pas, lifting of excessive quantities of product by the rotating circular disk may result in unwanted conditions, such as for example disruption of film formation. A method for preventing this phenomenon, which is improved relative to DE 4 447 422 C2, is to provide horizontal doctor bars on the stators at the bottoms filling level. Any coalescence of melt behind this bar in the direction of rotation of the rotor is thus avoided. These bars may be mounted directly on the housing or be supported by optional additional bars which are likewise fastened to the evaporator wall. The doctor bars and/or supporting bars may here be designed, as described in DE 44 47 422 C2, in such a manner as to promote material conveyance. This is particularly significant and advantageous to assist conveyance of the melt to the evaporator outlet.

It may be advantageous to heat the vapour or gas zone differently from the underlying melt or bottoms zone. It is accordingly advantageous to heat the upper gas zone to a lower level, e.g. lower by 5 to 20° C., than the melt zone therebelow. Any polymer films on the walls in the gas zone have a long residence time and suffer less damage due to lower temperatures.

This measure ensures longer evaporator service periods, reduced formation of specks due to cracked products and better colours of the final products.

Different degassing process temperatures must be selected for different polymers. They are substantially dependent on the thermal stability of the polymer to be processed. Another vital factor is also the desired residual content of constituents to be stripped. Pressures are adjusted between 0.01 and 15 mbar, preferably 0.05 to 10 mbar and the average residence times amount to 10 to 240 minutes, preferably 15 to 180 minutes and particularly preferably between 20 and 60 minutes.

If the temperatures of the polymer melts introduced into the evaporator apparatus are appreciably below, e.g. by 20 to 50° C., the desired operating temperatures of the evaporator apparatus (200 to 350 K), it may be advantageous to heat the melt before introduction with heat exchangers suitable for polymer melts. In this manner, it is possible to reduce the temperature differences between the heating medium and the product in the evaporator in order to avoid product damage on the walls.

Preferably, the product is introduced into the evaporator via a valve with automatic pressure control in such a manner that direct depressurisation into the product space occurs at the input end of the evaporator. Due to the elevated thermal potential of the immediate surroundings, cooling effects are avoided, which may be disadvantageous with regard to particle contents, for example of a crystalline nature. To this end, the product inlet valve is for example arranged in the front face of the reactor.

It is advantageous to offset the vapour outlets arranged on the top of the evaporator by 15° to 60° relative to the perpendicular in the direction of rotation of the rotor, in order to reduce melt reflux.

The object of the invention is further achieved with a stripping apparatus comprising a horizontally arranged, cylindrical housing, a rotor comprising circular perforated disks which are mounted on a central shaft and connected together with a horizontally arranged, perforated hollow cylinder, wherein the length-to-diameter ratio of the first cylinder is between 0.6 and 2.5.

Any conventional materials which do not cause direct damage to the product may be used for the production and manufacture of the evaporator apparatus according to the invention. Particularly suitable materials for the treatment of polycarbonates are non-rusting steels of type CrNi(Mo) 18/10, such as for example 1.4571 or 1.4541 (steel classification 2001, publisher: Stahlschlüssel Wegst GmbH, Th-Heuss-Straße 36, D-71672 Marbach) and Ni-based alloys of type C, such as for example 2.4605 or 2.4610 (steel classification 2001, publisher: Stahlschlüssel Wegst GmbH, Th-Heuss-Straße 36, D-71672 Marbach). The non-rusting steels are used at process temperatures of up to approx. 290° C. and the Ni-based alloys at process temperatures of above approx. 290° C. When treating styrene polymers and styrene copolymers, for example comprising acrylonitrile, a stainless steel typical for chemical applications, for example 1.4571 to DIN or 316 SS to ASME, is advantageous for product quality.

The principle of the apparatus according to the invention is shown in FIG. 1. The polymer melt is introduced via the product inlet 1 of the housing 10 using a pipe with control valve into the front face of the evaporator. The product discharge 2 of the polymer melt takes place at the opposite end on the underside of the housing 10 by means of a gear pump. The evaporated volatile constituents are drawn off at the top via the vapour port 3. The rotor with the annular disks 5 mounted thereon is set in rotation with a shaft 4. The annular disks 5 are connected together via a hollow shaft (hollow cylinder) 9. The stators 6 fastened to the inner wall 8 of the housing 10 spread the polymer melt on the annular disks 5 and, at elevated viscosities, prevent bridging between the annular disks 5. The level of the bottoms is adjusted with an overflow weir, which may be a metal sheet 7 without or also with openings. In the embodiment shown in FIG. 1, the central shaft is arranged centrally in the housing (outer cylinder) 10.

The necessary vacuum is preferably generated using jet or vapour pumps which are ideally operated with substances inherent to the system and process. It is, however, also possible to use conventional liquid ring pumps in combination with lobe pumps to generate the vacuum. It is advantageous to operate the liquid ring pumps with a substance from the process.

The present invention provides the use of such apparatus for the removal of volatile components from polymer melts, in particular from melts of engineering thermoplastics such as polycarbonate, polyester, polyester carbonates, polyamides, polymethyl methacrylate, and blends of these polymers etc., particularly preferably polycarbonate, polyester, polyester carbonates, and blends of these polymers, very particularly preferably polycarbonate.

The present invention also provides the use of the process according to the invention in processes for the production of polymers, in particular of engineering thermoplastics such as polycarbonate, polyester, polyester carbonates, polyamides, polymethyl methacrylate, polystyrene, copolymers of styrene and acrylic monomers such as acrylonitrile and/or methyl methacrylate, and blends of these polymers etc., particularly preferably polycarbonate, polyester, polyester carbonates and copolymers of styrene and acrylonitrile, and blends of these polymers, very particularly preferably polycarbonate.

The polymer melts to be stripped may originate from various processes such as two-phase interfacial condensation reactions, melt transesterification reactions, solid phase condensation reactions, emulsion polymerisation reactions, bulk polymerisation reactions and the like or be produced by melting existing polymeric material. There are no limitations or restrictions with regard to the manner of polymer production, the installation used or the production process which is performed.

The polymer melts to be stripped may be combined with inhibitors before the apparatus according to the invention is used. Inhibitors are taken to mean any compounds which have a decisive inhibitory effect on chemical reaction kinetics, such that quality-impairing modification of the polymer is avoided. Addition thereof is, for example, necessary after the production of polymers which still contain monomers and reaction products after completion of the reaction in order to reduce the contents of low molecular weight compounds by thermal processes.

Suitable inhibitors for polycarbonate which has been produced by the transesterification process are acid components such as Lewis or Brøonsted acids or esters of strong acids. The pKa value of the acid should be no greater than 5, preferably less than 3. The acid components or the esters thereof are added in order to deactivate the reaction mixture, i.e. ideally to bring the reaction to a complete standstill.

Examples of suitable acid components are: orthophosphoric acid, phosphorous acid, pyrophosphoric acid, hypophosphoric acid, polyphosphoric acid, benzenephosphonic acid, sodium dihydrogenphosphate, boric acid, arylboronic acids, hydrochloric acid (hydrogen chloride), sulfuric acid, ascorbic acid, oxalic acid, benzoic acid, salicylic acid, formic acid, acetic acid, adipic acid, citric acid, benzenesulfonic acid, toluenesulfonic acid, dodecylbenzenesulfonic acid and any other phenyl-substituted benzenesulfonic acids, nitric acid, terephthalic acid, isophthalic acid, stearic acid and other fatty acids, acid chlorides such as phenyl chloroformate, stearic acid chloride, acetoxy-BP-A, benzoyl chloride and esters, semi-esters and bridged esters of the above-stated acids such as for example toluenesulfonic acid esters, phosphoric acid esters, phosphorous acid esters, phosphonic acid esters, dimethyl sulfate, boric acid esters, arylboronic acid esters and other components which regenerate acid on exposure to water such as tri-iso-octylphosphine, Ultranox 640 and BDP (bisphenol diphosphate oligomer).

Compounds which may preferably be considered here are orthophosphoric acid, phosphorous acid, pyrophosphoric acid, hypophosphoric acid, polyphosphoric acid, benzenephosphonic acid, sodium dihydrogenphosphate, boric acid, arylboronic acid, benzoic acid, salicylic acid, benzenesulfonic acid, toluenesulfonic acid, dodecylbenzenesulfonic acid and any other phenyl-substituted benzenesulfonic acids, acid chlorides such as phenyl chloroformate, stearic acid chloride, acetoxy-BP-A, benzoyl chloride and esters, semi-esters and bridged esters of the above-stated acids such as for example toluenesulfonic acid esters, phosphoric acid esters, phosphorous acid esters, phosphonic acid esters, boric acid esters, arylboronic acid esters and other components which regenerate acid on exposure to water such as tri-iso-octylphosphine, Ultranox 640 and BDP.

Compounds which may particularly preferably be considered are orthophosphoric acid, pyrophosphoric acid, polyphosphoric acid, benzenephosphonic acid, benzoic acid, benzenesulfonic acid, toluenesulfonic acid, dodecylbenzenesulfonic acid and any other phenyl-substituted benzenesulfonic acids and esters, semi-esters and bridged esters of the above-stated acids such as for example toluenesulfonic acid esters, phosphoric acid esters, phosphorous acid esters, phosphonic acid esters and other components which regenerate acid on exposure to water such as tri-iso-octylphosphine, Ultranox 640 and BDP.

Compounds which may very particularly preferably be used are orthophosphoric acid, pyrophosphoric acid, benzenesulfonic acid, toluenesulfonic acid, dodecylbenzenesulfonic acid and any other phenyl-substituted benzenesulfonic acids and esters, semi-esters and bridged esters of the above-stated acids such as for example toluenesulfonic acid esters and phosphoric acid esters.

The acidic components may be apportioned in solid, liquid or gaseous form. In a preferred method, the acidic component is continuously homogeneously incorporated into the product stream from which monomers are, for example, to be removed directly once the desired final molecular weight has been achieved in order to begin evaporating the residual monomers immediately thereafter. In a particularly preferred method, incorporation of additives to improve individual product properties is performed downstream from apportionment of the acid and stripping and not together with the stripping step because additives are often used which are volatile under a vacuum, which is essential to stripping, and the necessary concentrations in the polymer are then difficult to establish.

The acidic components are preferably added in liquid form. Since the quantities to be apportioned are very small, solutions of the acidic components are preferably used.

Suitable solvents are those which do not disrupt the process, are chemically inert and evaporate rapidly.

Properties of the resultant polymers may be modified with conventional additives and additional substances (e.g. auxiliaries and reinforcing materials). The purpose of adding additives and added substances is to extend service life (for example hydrolysis or degradation stabilisers), to improve colour stability (for example heat and UV stabilisers), to simplify processing (for example mould release agents, flow auxiliaries), to improve service characteristics (for example antistatic agents), to improve flame retardancy, to influence visual appearance (for example organic colorants, pigments) or to adapt polymer properties to specific stresses (impact modifiers, finely divided minerals, fibrous materials, silica flour, glass fibres and carbon fibres). These may all be combined at will in order to establish and obtain desired properties. Such added substances and additives are described, for example, in "Plastics Additives", R. Gächter and H. Müller, Hanser Publishers 1983, in Additives for Plastics Handbook, John Murphy, Elsevier, Oxford 1999 or in Plastics Additives Handbook Hans Zweifel, Hanser, Munich 2001.

These additives and added substances may be added to the polymer melt individually or in any desired mixtures or in two or more different mixtures and in particular directly on isolation of the polymer or alternatively after melting pelletised material in a "compounding" step.

The additives and added substances or mixtures thereof may here be added to the polymer melt as a solid, i.e. as a powder, or as a melt and also in the form of solutions in suitable solvents. Another apportionment method is to use masterbatches or mixtures of masterbatches of the additives or mixtures of additives.

These substances are preferably added to the finished polymer using known apportioning units, but, if required, they may also be added at another stage of the polymer production process. Mixing with the polymer proceeds in apparatus known for this purpose, such as for example screw machines or static mixers.

EXAMPLES

Determination of Stated Analytical Characteristics:

Rel. Viscosity:

Relative viscosity is determined as the quotient of the viscosity of the solvent and the viscosity of the polymer dissolved in this solvent. It is measured in dichloromethane at 25° C. at a concentration of 5 g/l of solution.

Residual Monomer Content:

Residual monomer content is determined by dissolving the sample in dichloromethane and then precipitating it with acetone/methanol. Once the precipitated polymer has been separated, the filtrate is evaporated. The residual monomers are quantified by reverse-phase chromatography in a 0.04% phosphoric acid/acetonitrile mobile solvent gradient. Detection is by UV means.

YI:

The YI value is determined to ASTM E 313 on injection moulded samples 4 mm in thickness. The injection moulding temperature is 300° C.

The following Examples are intended to illustrate the invention, but without restricting its scope:

The same polycarbonate, produced by the transesterification process, is used for all the Examples. The data are stated in Table 1. In order to be able to achieve and compare the stripping effect, the polycarbonate pellets are sprayed prior to use with such a quantity of 1% phosphoric acid and homogenised at room temperature in a tumble dryer that the concentration of 100% phosphoric acid relative to the polycarbonate is 5 ppm.

Likewise in all the Examples, the pellets were melted at 290° C. at a rate of 50 kg/h in a melting extruder (model ZSK 32 MC, Coperion Werner & Pfleiderer) in order to be introduced directly thereafter into the stripping apparatus.

Example 1

The melt produced in the melting extruder is [conveyed] into a device according to DE 4 447 422 C2 with a rotor diameter of 620 mm and a ratio of rotor diameter-to-length of 0.8, which is operated at a rotational speed of 1.3 revolutions per minute at 290° C. and 1 mbar absolute. The filling level is adjusted such that an average residence time of 20 minutes is obtained. The melt is discharged with a gear pump via a nozzle, shaped into bristles, cooled and pelletised. The data obtained are shown in Table 1.

Comparative Example 1

As Example 1, but using an apparatus according to DE 4 447 422 C2 with a rotor diameter of 620 mm and rotor diameter-to-length ratio of 3. The rotational speed, pressure and temperature are as in Example 1, but the average residence time is 90 minutes.

Comparative Example 2

The melt produced in the melting extruder is conveyed into a model ZSK 40 degassing screw machine from Werner & Pfleiderer with a screw diameter of 40 mm and a ratio of external to root diameter of the screws of 1.55. The degassing screw machine, which is operated at a wall temperature of 300° C., has two degassing zones. The first degassing zone is operated at atmospheric pressure. 0.25% by mass of nitrogen, relative to the quantity of melt, is apportioned before the second degassing zone. The pressure in the second degassing zone is 2 mbar absolute. The melt is discharged via a nozzle, shaped into a plurality of strands, cooled and pelletised. The data obtained are shown in Table 1.

Comparative Example 3

The melt produced in the melting extruder is passed into a strand evaporator, which is heated to 290° C. and is at a vacuum of 1 mbar absolute. The melt is here subdivided into strands by means of a spinneret plate with 150 bores, each of a diameter of 3 mm, the strands free-falling for 3 m in the cabinet. The melt coalesces on the base and is discharged with a gear pump via a nozzle, shaped into a plurality of strands, cooled and pelletised. The data obtained are shown in Table 1.

TABLE 1

|  | Relative viscosity | DPC [ppm] | BPA [ppm] | Phenol [ppm] | YI |
|---|---|---|---|---|---|
| Initial product | 1.204 | 520 | 11 | 76 | 1.9 |
| Example 1 | 1.208 | 50 | 5 | 49 | 2.3 |
| Comparative Example 1 | 1.211 | 45 | 6 | 55 | 3.4 |
| Comparative Example 2 | 1.205 | 175 | 8 | 67 | 2.5 |
| Comparative Example 3 | 1.205 | 220 | 8 | 70 | 2.4 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for stripping volatile constituents from polymer melts comprising introducing the melt into a horizontally oriented cylindrical device having a length to diameter ratio of 0.6 to 2.5 that contains a plurality of perforated disks rotating about a common horizontally oriented, externally driven shaft bringing the melt and disks into contact in a manner calculated to constantly renew the surface of the melt to be stripped, wherein the perforated disks have equal-sized holes having a common size A conforming to $A = x \, (\eta^2/(\text{kg}^2 \, \text{m}^{-5} \, \text{s}^{-2}))^{1/3}$ wherein x is $2 \cdot 10^{-3}$ to $3 \cdot 10^{-2}$ and $\eta$ is the kinematic melt viscosity in Pas.

2. The process according to claim 1 wherein the shaft is perforated and hollow.

3. The process according to claim 1 where the device further contains stators having horizontal cross bars, the stators positioned between the disks.

4. Stripping apparatus comprising a horizontally arranged, cylindrical housing, a rotor comprising circular perforated disks which are mounted on a central shaft and connected together with a horizontally arranged, perforated hollow cylinder, wherein the length-to-diameter ratio of the first cylinder is between 0.6 and 2.5.

* * * * *

UNITED STATES PATENT AND TRADEMARK OFFICE
Certificate

Patent No. 7,060,788 B2

Patented: June 13, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Uwe Hucks, Alpen (DE); Thomas König, Leverkusen (DE); Melanie Möthrath, Düsseldorf (DE); Eike Schulz van Endert, Berlin (DE); Hans-Peter Hoffmann, Velten (DE); and Klaus Schroder, Berlin (DE).

Signed and Sealed this Twenty-second Day of March 2011.

HAROLD Y. PYON
*Supervisory Patent Examiner*
Art Unit 1761
Technology Center 1700